US012739737B1

(12) United States Patent
Sills et al.

(10) Patent No.: US 12,739,737 B1
(45) Date of Patent: Sep. 15, 2026

(54) ENSURING PRIVILEGED USERS HAVE ACCESS TO SUFFICIENT AIRTIME ON WIRELESS NETWORKS HOSTING NON-PRIVILEGED USERS

(71) Applicant: Calix, Inc., San Jose, CA (US)

(72) Inventors: Daniel J. Sills, Moss Beach, CA (US); Francisco Moreno, Santa Clara, CA (US); Ihsin Lee, Dallas, TX (US); Harold A. Roberts, Excelsior, MN (US); Eric I. Leal, Richardson, TX (US); Krunal G. Patil, Morrisville, NC (US)

(73) Assignee: Calix, Inc., San Jose, CA (US)

( * ) Notice: Subject to any disclaimer, the term of this patent is extended or adjusted under 35 U.S.C. 154(b) by 558 days.

(21) Appl. No.: 18/346,260

(22) Filed: Jul. 2, 2023

Related U.S. Application Data

(60) Provisional application No. 63/455,969, filed on Mar. 30, 2023.

(51) Int. Cl.
*H04W 4/00* (2018.01)
*H04W 48/16* (2009.01)
*H04W 48/20* (2009.01)
*H04W 88/16* (2009.01)

(52) U.S. Cl.
CPC .......... *H04W 48/16* (2013.01); *H04W 48/20* (2013.01); *H04W 88/16* (2013.01)

(58) Field of Classification Search
CPC ..... H04W 48/16; H04W 48/20; H04W 48/02; H04W 84/12; H04W 88/16; H04L 63/10
USPC .......................................................... 455/434
See application file for complete search history.

(56) References Cited

U.S. PATENT DOCUMENTS

2012/0224481 A1* 9/2012 Babiarz ............... H04L 47/2408 370/230.1
2013/0303114 A1* 11/2013 Ahmad ............... H04L 12/1407 455/406
2014/0092736 A1* 4/2014 Baillargeon .......... H04W 72/54 370/252
2016/0043953 A1* 2/2016 Ringland ............ H04W 28/023 370/230
2017/0142637 A1* 5/2017 Brock .................. H04W 60/04

* cited by examiner

*Primary Examiner* — Temica M Beamer
(74) *Attorney, Agent, or Firm* — Staniford Tomita LLP

(57) ABSTRACT

Providing resource control for public sharing of access points to private residential Wi-Fi networks. A control component takes periodic free airtime (FAT) measurements to provide adaptive access control by public devices to private networks. Normal and generous threshold levels are provided to differentiate various actions allowing or denying public device access to prevent public usage from impacting the private user experience. The system constantly measures free airtime and only grants public device access to their Wi-Fi as a public hotspot if sufficient free airtime is available to seamlessly preserve the private user experience. Public usage is maximized by providing real-time determination of free airtime to allow spare capacity to be used by as many public users as feasible.

17 Claims, 6 Drawing Sheets

ENSURING PRIVILEGED USERS HAVE ACCESS TO SUFFICIENT AIRTIME ON WIRELESS NETWORKS HOSTING NON-PRIVILEGED USERS

CROSS-REFERENCE TO RELATED APPLICATIONS

The present application claims priority to U.S. Provisional Patent Application No. 63/455,969, filed on Mar. 30, 2023, entitled "Providing Sufficient Free Airtime for Privileged Users on Private Wi-Fi Networks when allowing Hotspot Access by Public Users," and which is assigned to the assignee of the present application.

TECHNICAL FIELD

Embodiments are directed to wireless networks, and specifically to controlling hotspot access by public devices to private networks to maintain private device Wi-Fi quality.

BACKGROUND

Internet access is typically provided to homes and businesses through Internet Service Provider (ISP) or Broadband Service Provider (BSP) companies (collectively referred to herein as "BSPs") that offer high-speed communications interfaces through equipment such as cable modems and access to transmission lines (e.g., DSL, Ti, Fiber, etc.). Such companies usually charge a monthly subscription fee to provide private access to residential (home) and business subscribers. However, Internet access via Wi-Fi is also increasingly being made available to the general public (i.e., for "public users") on these private networks. For example, the Calix SmartTown™ Wi-Fi service allows BSPs to offer public Wi-Fi to people by activating a mode in the equipment that turns private access points into hotspots for public access. Such a service effectively allows a subscriber's private network and equipment to be shared with public users, often without knowledge of such sharing by the subscriber (also referred to as a "private user").

As can be appreciated, a conflict exists when such public use starts to negatively impact the Wi-Fi experience of the private users, who pay for and expect a certain minimum amount of network resources per their subscription agreement. The network resource relevant in this case is airtime, which is the time available to transmit wireless signals. If any public usage of private networks has a negative effect on the airtime available to private use, then the private users will certainly take issue with the BSPs, thus making any shared public/private model untenable.

Prior methods of sharing set pre-defined, fixed limits to the number of connected devices for hotspots that share public and private Wi-Fi services, such as by not allowing more than a certain number (e.g., 5) concurrent public users at any time. Such methods have certain drawbacks, such as the case where even a single public user can consume inordinate amounts of airtime to the detriment of the private users. This type of hard limit on the number and/or access time of public users can also unduly limit public user enjoyment of the service even when there might be available capacity that would not affect private users.

What is needed, therefore, is a method for ensuring sufficient airtime resources for private Wi-Fi users when their networks are made available to public users as hotspots, and yet not unduly starve the public users of such airtime resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Calix, GigaSpire, GigaSpire BLAST, and SmartTown are trademarks of Calix, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
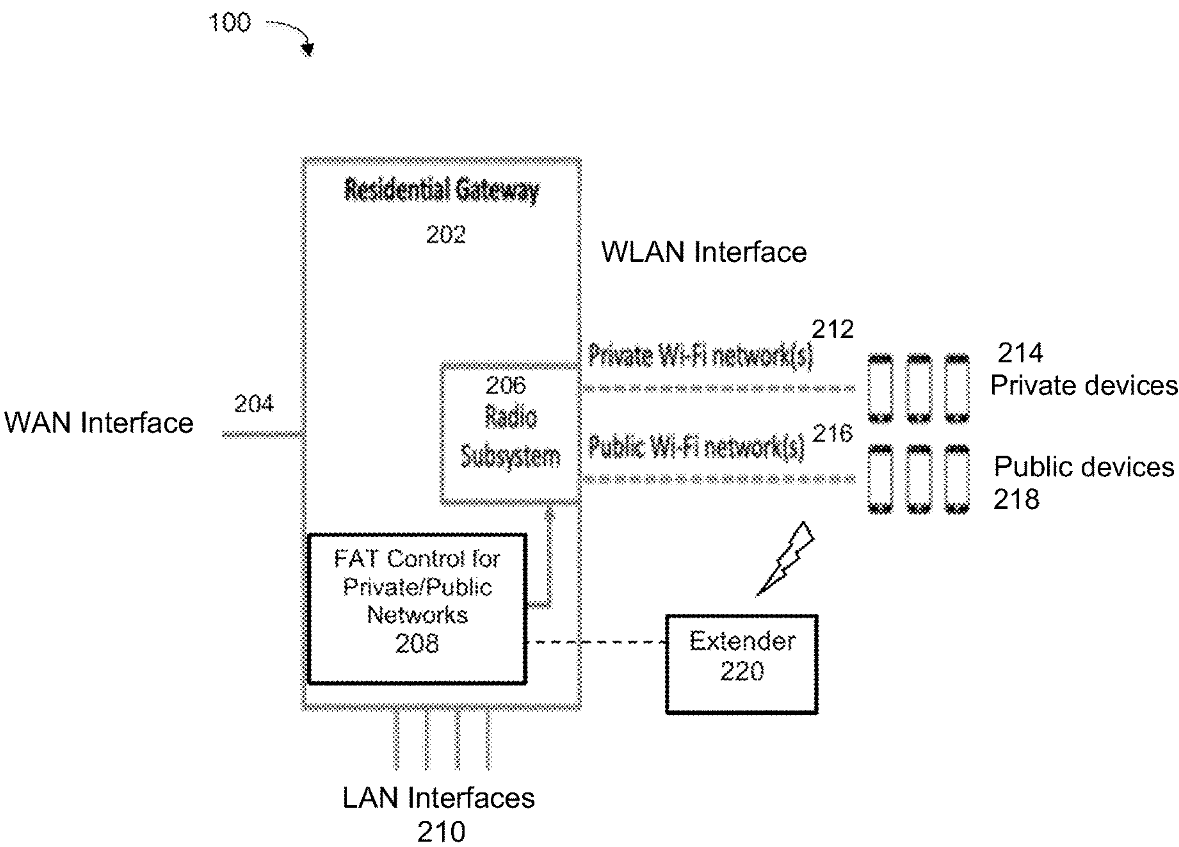
FIG. 1 illustrates implementation of a residential gateway incorporating a free airtime control component, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to systems and methods for judiciously allocating a residential gateway device's Wi-Fi airtime capacity between private (e.g., residential/business service) and public users, where a private user generally means a user who pays a BSP for Internet access, such as through a subscription or other fee-based arrangement. Such a private user typically expects exclusive use of the provided interface equipment (e.g., routers, modems, extenders, etc.) to freely and fully access the Internet with sufficient bandwidth and data rates under the terms of their arrangement. Such an arrangement is typically understood to provide Internet access from within the boundaries of a home or building to the private user and their family, authorized guests, employees, affiliates, and so on.

In some cases, a BSP may enable the private user's equipment (access points) to be used by 'public users' who are not affiliated with the private users, and whose use of their equipment is usually not even known by the private user. A public user thus uses the private user's equipment as a 'hotspot' typically on a temporary or fleeting basis, while the private user is simply the subscriber. In this type of scenario, the service provider must ensure that the private user experiences no degradation in their ability to access the Internet when any public user is using their resources.

The measure of the resources thus allocated to the public user from the private user's equipment and access account is the airtime of the private user's access point or gateway equipment. Embodiments are directed to a stateless free air-time preservation (SFATP) mechanism that ensures that there is sufficient free air-time available for private users to be able to promptly claim and retain more airtime when they need it, but at the same time try to ensure that public users are not unduly starved of resources. Such embodiments constantly monitor the airtime consumption of the interface equipment and curtail or even cutoff access by the public users when private users are in danger of suffering service degradation to thus provide the private users full value of their BSP service contracts.

FIG. 1 illustrates an embodiment of a residential gateway incorporating a FAT control component to preserve the Wi-Fi quality of a private network user when the gateway is allowed to be used by one or more public users. Network 100 represents a "premises network" that may be installed in a home, small business, or other similar facility. The premises network includes a residential gateway 202 and may also include one or more extender devices to increase a Wi-Fi signal footprint in the premises. Such access is generally provided by a BSP for a fee or monthly subscription that provides uninterrupted Internet service at certain agreed upon performance levels, such as access speed, data transfer rate, minimum outage periods, data security protections, and so on.

The gateway 202 includes a WAN (wide area network) interface 204 for communication to the Internet through a BSP, as well as other possible LAN interfaces 210 to communicate with other networks. A radio subsystem 206 providing wireless circuitry (e.g., radio chips, amplifiers, radio filters, antennas, etc.) provides access to Wireless LAN (WLAN) interfaces, such as private networks 212 associated with private devices 214 and public networks associated with public devices 218. The private devices 214 are usually located and used within the home or residence/business building, or very close by (e.g., porch, balcony, etc.). The public devices (e.g., smartphones, tablets, laptops, etc.) are typically used by users near but not within the residence and within range of the radio subsystem 206. Extended range for devices using the gateway 202 may be provided by extender devices 220.

It should be noted that any of the network links shown in FIG. 1, may be implemented as either wired or wireless connections, but the Wi-Fi links (shown as dashed lines) are always implemented as wireless connections. Any appropriate intermediate devices (e.g., buffers, switches, etc.) otherwise not shown, may also be used within these links.

As mentioned previously, a BSP may make the residential gateway 202 available as a hotspot to the public devices 218 without the knowledge of the private device user. Because such public users are typically much further away from the radio subsystem 206 than the private users, and hence need much more airtime to transmit or receive a given amount data than do private users, their presence may have a significant impact on the airtime available to the private users.

A control component 208 within or coupled to the gateway 202 and having a CPU executing appropriate software attempts to ensure that the private devices 214 (i.e., devices operated by privileged users), can claim and retain airtime when they need it. In an embodiment, the control component 208 uses Free Airtime (FAT) as a proxy for the ease with which private users can claim and retain airtime when they need it. FAT is unitless metric, expressed as a percentage that represents the extent to which the medium is unused (e.g., if FAT is 66% the medium is occupied by transmissions ⅓rd of the time and unoccupied ⅔rd of the time.) The ease with which private users can claim and retain airtime when they need it is directly proportional to FAT.

The FAT control component 208 is configured to attempt to ensure that sufficient FAT is available so that the private devices 214 can claim and retain the airtime when they want it. Component 208 measures FAT in real time (or near-real time) and uses that information as the basis to allow or bar the use of the gateway 202 by public devices 218. This component may be provided as a component or process within the gateway 202 (as shown), or as a separate networked component accessible to all gateway within a certain radius, or even as a cloud based process accessed through Internet.

FIG. 1 illustrates one embodiment of a FAT control component in a gateway device, and other configurations are also possible. For example, system 200 is independent on the number of streams/antennas, number of supported bands, band in use, channel in use, and so on. Such a system can process any practical number of Wi-Fi streams, in any band, and in any channel.

Network 100 of FIG. 1 includes or may be part of a system that includes different types of links, such as wired links or wireless links. Each device or network element may represent a node in the network and is coupled to at least one or more other nodes for transmission of messages (data packets) in accordance with defined routing protocols. For example, network clients (private 214 and/or public 218) may be laptop/notebook computers (e.g., 113), tablet computers, cell phones, IoT (internet of things) devices, and other wireless devices. In an embodiment, the links between the devices and gateway may be a wireless (Wi-Fi) link using wireless protocols, such as IEEE 802.11, Bluetooth, or any other appropriate wireless standard. Some of the transmission links used in network 110 may be cellular communication links or any other telephonic or WAN/LAN network link, and internal or external wired links may be implemented using copper, fiber, or any other appropriate hardwired link. In the case of wireless connections, one or more extender devices 220 may be placed around the home or area to boost the Wi-Fi signal. Such an extender may also be referred to as a 'Wi-Fi booster,' 'range extender,' 'repeater' or similar term, and are often used when distances between devices are great and/or signal strength is low due to equipment of physical constraints.

Certain new Wi-Fi access features, such as Calix SmartTown Wi-Fi provide BSPs a way to offer public users (i.e., those with no relationship to the subscriber) Wi-Fi access using private network equipment. Thus, while the home or business premises network 100 represents a private Wi-Fi environment paid for by the subscriber, a public device environment 218 can include any number of public users leveraging the residential gateway 202 through their own devices, such as tablets, computers, phones, etc. In this case, the residential gateway 202 serves as a public Wi-Fi hotspot that acts as an Internet access point for public users.

With respect to FIG. 1, the term private device 214 means a network device that is used by a private user that is assumed to own or have exclusive rights to the gateway equipment, BSP subscription, and so on. Such a user is a 'privileged user' in that his or her rights to use take absolute priority with respect to quality of network service over any other user including users of public devices 218, or so-called 'non-privileged users' or 'hotspot users.' Thus, for purposes of description, a private device user may also be referred to as a privileged user, and a public device user may be referred to as a non-privileged user. This privilege may be inherent through ownership or control (such as in a typical homeowner situation), or it may be established by policies, contracts, assignments, and so on, as a 'subscriber.'

Figure 2:
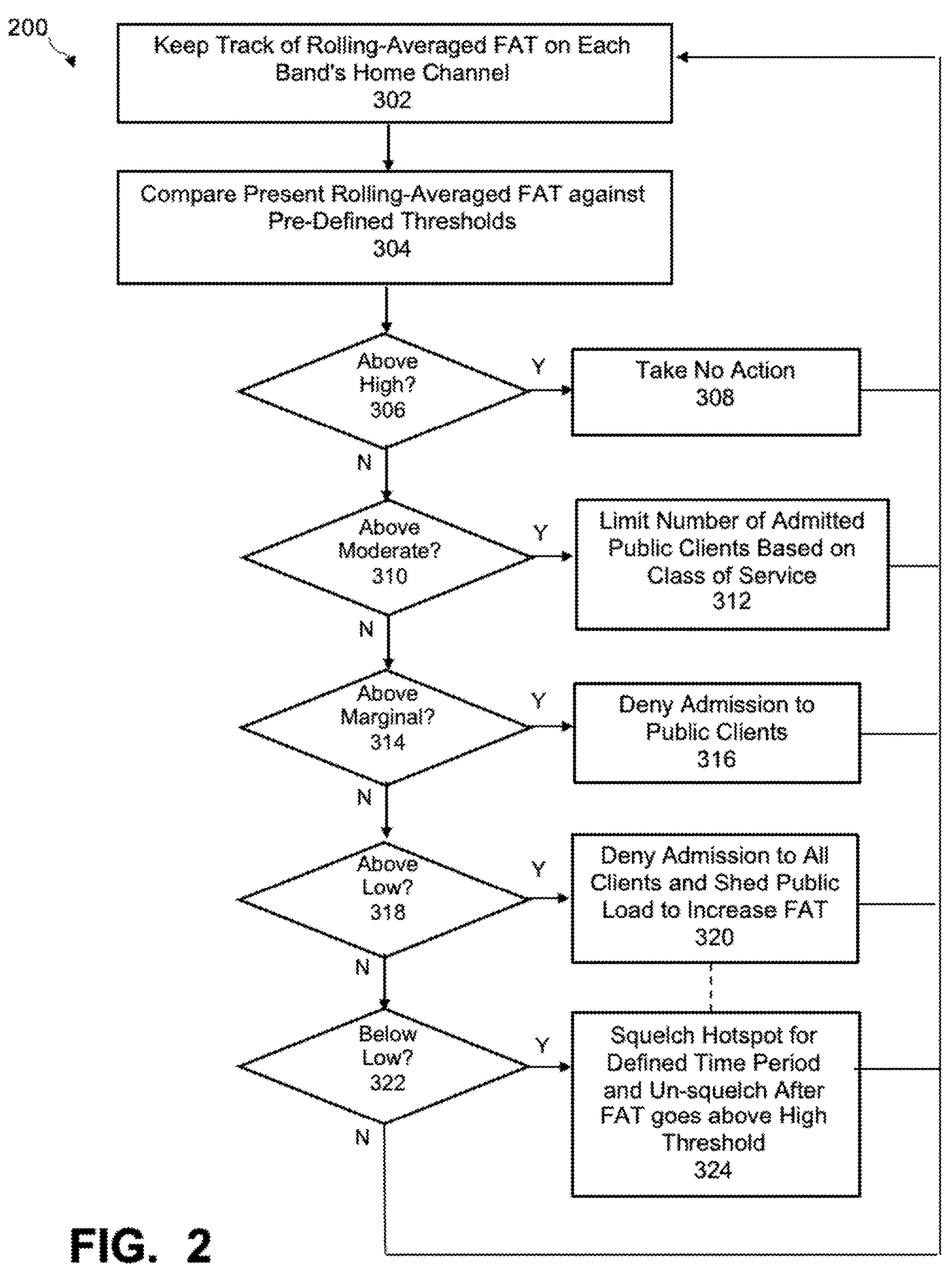
FIG. 2 is a flowchart that illustrates a method of maintaining stateless free airtime using the free airtime control of FIG. 1, under some embodiments.

It should be noted that FIG. 2 illustrates an example network and many different network configurations and topologies are possible. Devices (or nodes) can be added to the network, or organized into sub-networks as provided by certain known networking protocols. FIG. 2 illustrates one example of a network topology, and embodiments are not so limited. A network of any practical scale, architecture, and configuration can be used with embodiments of the processes and components described herein.

In an embodiment, the premises gateway network environment 100 may be a community Wi-Fi environment, such as a Calix SmartTown™ Wi-Fi managed environment. Such a system comprises a special set of clients that the network operator provides service with specific bandwidth needs, such that the system software can predict the amount of channel airtime that will be needed, such as based on client Wi-Fi capabilities and location. In some implementations, the SmartTown Wi-Fi provides community-wide coverage by combining wide-scale residential and small business Wi-Fi systems with strategically deployed hotspot Wi-Fi access points in public gathering areas, event centers, and private locations, such as by leveraging private network resources. The community Wi-Fi service can be provided on a temporary basis for special events, such as concerts, fairs, sporting events, rallies, and so on, in which Wi-Fi demand may be very heavy for a relatively short duration. Alternatively, it may be provided on a permanent or semi-permanent basis for an open location, such as a public square, meeting area, and so on.

In an embodiment, the SmartTown (or similar) community Wi-Fi system is a service that utilizes certain Wi-Fi alliance standards (e.g., Wi-Fi Alliance Passpoint 2.0) to provide Wi-Fi access to subscribers using certain Wi-Fi access point devices. One such example device is a Calix Gigaspire BLAST. These devices extend the access network into the home and act as a strategic location for control of the network by supporting broadband connectivity of data and video services and offering the latest 802.1 lax 'Wi-Fi 6' technology. The Calix GigaSpire provides switching and routing functions that support multi-Gigabit throughput for IPTV video and data services. An example device, the GigaSpire BLAST u6.2, uses a 2.5 Gigabit Ethernet link at the subscriber's premises to provide carrier-class Wi-Fi. The GigaSpire BLAST u6.1 uses a one Gigabit Ethernet link at the subscriber's premises to provide carrier-class Wi-Fi. Other models can support an SFP+ module that allows for one Gigabit to ten Gigabit connections using Ethernet, Active Ethernet and GPON. Any number of interfaces (e.g., four) Gigabit Ethernet LAN interfaces can be provided for customer multi-media devices. Such operating parameters are provided for purposes of example only, and other similar access point devices can also be used.

Although a specific public or community Wi-Fi systems are mentioned for purposes of example, any open or large-scale Wi-Fi environment may also implement embodiments described herein. In general, the term "gateway" refers to an access point or any device that provides access to the radio circuitry that enables wireless communication to the Internet 110 by private and/or public users. All gateways have a finite amount of processing resources and airtime capacity, which, when exceeded block new or excessive usage devices from accessing the Internet. As stated above, when used by a public user device, the gateway essentially becomes a public hotspot where at least some of the gateway resources and FAT capacity is used by the public device.

In general, the term 'access point' (AP) refers to a gateway device that is assigned a service set identifier (SSID), which is an alphanumeric string that uniquely names a wireless LAN (WLAN) as a network name. A WLAN may consist of several APs, all using the same SSID or different SSIDs, and each AP may emanate one or more SSIDs. For example, a residential gateway (Wi-Fi router, modem, etc.) may have an SSID:'owner' with a guest network 'owner_guest.' Moreover, each SSID (which are themselves APs) may support more than one band (e.g., 2.4 GHz and 5 GHz). Thus, one gateway device may support multiple (e.g., 4 or more) APs. In networks where extenders (e.g., 220) connect wirelessly to the residential gateway and are used to boost Wi-Fi signals in the residence, backhaul SSIDs may be used, where the backhaul is an AP/VAP (access point/virtual access point).

For the embodiment of FIG. 1, residential gateway 202 is located in a residence or small business and provides access to private device users and public device users as long as the airtime consumed by the public device use does not impact the FAT available to the private (privileged) users.

Embodiments of the control process/component 208 measures FAT of the gateway 202 in real time (or near-real time) and uses that information as the basis to calculate and allow access by public Wi-Fi network(s) 216. The FAT capacity measurement is generally available from mainstream Wi-Fi silicon devices and may be calculated from a standard Data Element defined in two Standards Development Organizations (SDOs), namely the Wi-Fi Alliance and the Broadband Forum.

The FAT control component 208 periodically (e.g., every 10 seconds) and generates a new instantaneous FAT value. The FAT values are then used to generate a rolling FAT value to smooth out the value FAT distribution curve. Based on the rolling FAT values, the FAT control 208 initiates actions regarding public device access 218 to the residential gateway 202 to ensure there is enough FAT to allow private users to get the quality of service they expect.

In an embodiment, the control process 208 uses a stateless free airtime preservation (SFATP) mechanism is to ensure there is sufficient FAT available for private Wi-Fi clients to be able to promptly claim and retain more airtime when they need it but at the same time try to ensure that public Wi-Fi clients are not unduly starved of resources.

The SFATP mechanism operates independently for each RF band (e.g., 2.4 GHz, 5 Ghz, etc.). At a high-level, the mechanism real-time monitors the current FAT value. If the FAT drops too low it will begin to deny admission to public Wi-Fi clients, and if it drops still further, it will start to terminate on-going public network sessions in order to bring the FAT up to a level that ensures private Wi-Fi clients are able to get the performance they require.

Figure 3:
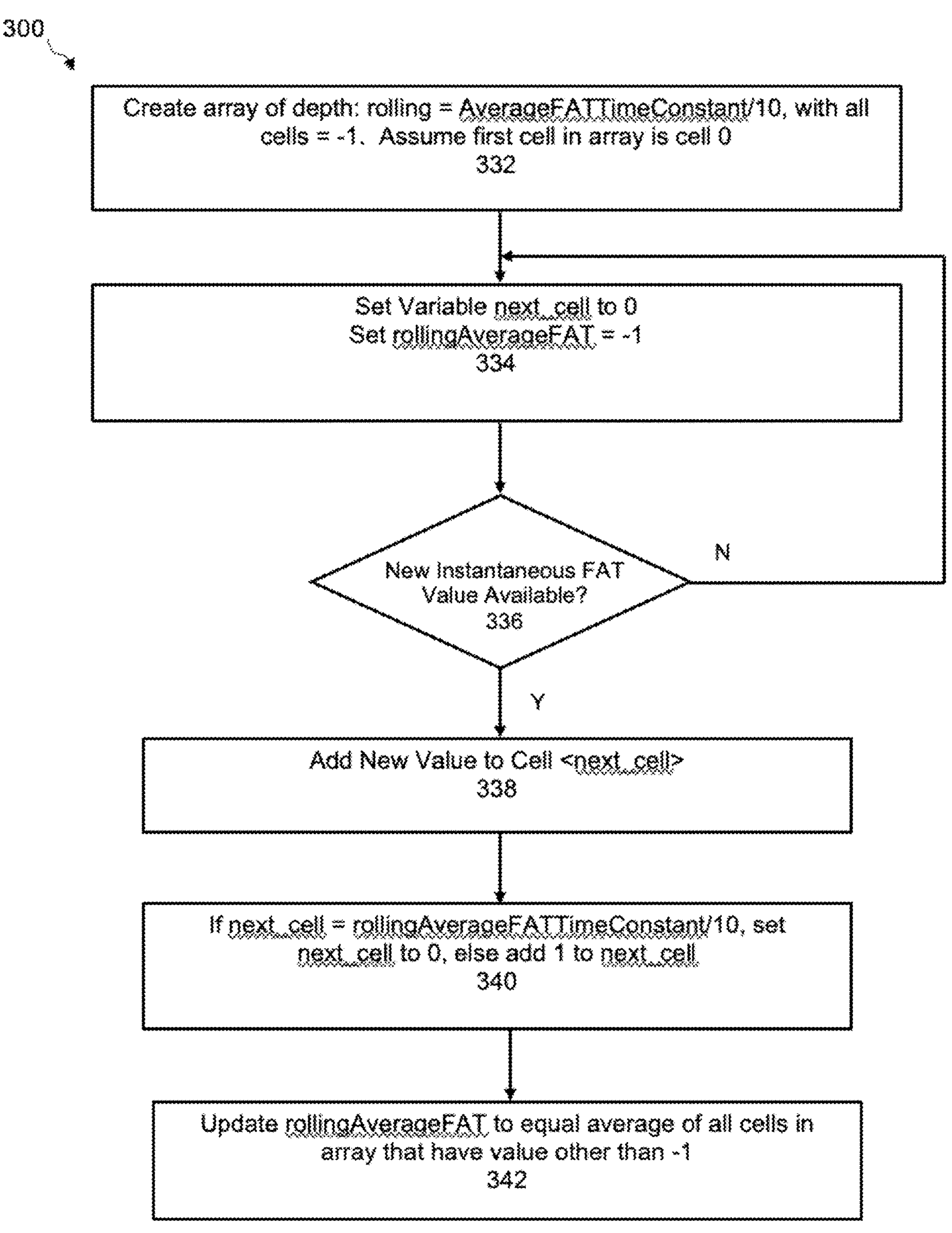
FIG. 3 is a flowchart illustrating steps for a qualitative state machine for maintenance of a rolling average free airtime per band, under some embodiments.

FIG. 2 is a flowchart that illustrates a method of maintaining stateless free airtime using the SFATP mechanism, under some embodiments. As shown in FIG. 3, process 200 keeps track of rolling-average FAT on the RF channel currently being used on each band, 302. It can then take actions (or do nothing) depending on the relationship between time-averaged average FAT and a set of defined (e.g., four) thresholds. These thresholds can be of any appropriate number and relative level, but generally thresholds are selected to represent a particular amount of FAT along a spectrum of: high, moderate, marginal and low.

In an embodiment, the monitoring step 302 uses a defined refresh rate to calculate the rolling-average FAT on each band. The refresh rate may be selected to balance processing overhead against as near real-time calculation as possible. Under some embodiments, the refresh rate is periodic and on the order of 10 seconds, however, other refresh rates can also be used depending on system capability and configuration. The refresh may also be asynchronous such that the FAT may be requested as needed and on demand by an appropriate command.

In step 304, the process compares a present rolling FAT value against these threshold values. For the example embodiment of FIG. 3, four threshold values are illustrated: high threshold, moderate threshold, marginal threshold, and low threshold. If the rolling-average FAT is above the high threshold, as determined in 306, the SFATP mechanism will take no actions against public Wi-Fi clients, 308. That is, it will neither deny them admission nor terminate any on-going public network sessions.

If the rolling-average FAT value is above the moderate threshold (but below the high threshold), as determined in step 310, the SFATP mechanism may admit a number of public Wi-Fi clients unconditionally and reduce or throttle-back the rate of acceptance of public Wi-Fi clients based on their respective class of service (CoS) requirements, 312. For example a certain number of high CoS clients may be admitted unconditionally, while the admittance of lower CoS clients may be throttled back to a less frequent admittance rate for any given span of time. For this embodiment, the CoS implements known methods of managing traffic in a network by grouping (classifying) similar types of traffic (e.g., e-mail, video, VoIP, etc.) together and treating each type as a class with its own level of network priority. The CoS may be defined in the data link layer (Layer 2) of the OSI model, and may range from 0 to 7 (or 0 to 15) for lowest to highest priority according to established standards. Other classifications to prioritize above moderate public users and public Wi-Fi traffic may also be used, such as quality of service (QoS), queue mechanisms, round-robin prioritization, and so on.

If the rolling-average FAT value is above the marginal threshold (but below the high and moderate thresholds), as determined in step 314, the SFATP mechanism will deny admission to all public network clients, 316.

If the rolling-average FAT value is above the low FAT threshold (but below the high, moderate, and marginal thresholds), as determined in step 318, the SFATP mechanism will deny admission to all clients seeking admission shed load by terminating established sessions in an effort to increase FAT, 320. The rate of load shedding can be slow or fast depending on how the mechanism is tuned to operate. If, in step 320, the mechanism finds that the FAT value has not increased to at least the moderate level after having terminated all sessions it will eventually squelch the hotspot 324.

If the rolling-average FAT value is below the low FAT threshold, as determined in step 322, the SFATP mechanism will squelch the hotspot for at least a defined (and configurable) period of time, and will only un-squelch the hotspot once the average FAT value goes above the high threshold, 324.

As shown in step 312, the process 300 is class of service (CoS)-aware with respect to throttling the rate of admittance of public network clients. Class of service can also be used to determine which public network sessions to terminate in steps 316 and 320. For example, the SFATP mechanism can be configured to never terminate a higher priority CoS session without having first terminated all lower priority CoS sessions.

When the SFATP mechanism denies admission to a public Wi-Fi client or terminates a public Wi-Fi client's session due to insufficient FAT, the system blacklists it (prevents it from re-accessing) for a set time (e.g., M minutes). For this embodiment, the blacklist time period can be a random value drawn from a uniform distribution between shortBlockDurationMin and shortBlockDurationMin+shortBlockDurationRange, where shortBlockDurationMin and shortBlockDurationRange are configurable parameters with default values, such as to 10 minutes and 20 minutes, respectively. These defaults lead to situation in which average blacklist duration is 20 minutes, for example.

Whenever the home channel of a radio is operationalized for any reason (e.g., dynamically forced channel change, auto configuration triggered by re-load of the radio, forced operationalization of non-DFS channel, etc.) the SFATP mechanism will enter an 'initialization' state during which it denies admission to all clients. The initialization ends once enough time has passed for the mechanism to have compiled a legitimate value for rolling-average FAT on the just operationalized channel. To ensure this, the length of time that the mechanism will stay in the initialization state will never be smaller than the rolling-average time constant (i.e., the length of time over which all instantaneous FAT measures are averaged). Note that during the initialization state, the SFATP mechanism will not terminate any sessions, which means that if any pre-existing sessions survived the act of operationalization (e.g., a channel change) they will continue to get service without risk of termination during the initialization stage.

As shown in FIG. 2, the process 200 keeps track of the rolling time averaged FAT on each band. The time-average FAT of a band (band B) is maintained through a FAT averaging process. In this process, the local variable rollingAverageFAT<B> represents the rolling average of FAT on band-B home channel. The value of rollingAverageFAT<B> is updated every 10 (or similar) seconds with 'instantaneous' FAT measurements of the band B home channel. This happens independent of the value of SFATPActions<B>. Whenever the band-B radio operationalizes a home-channel for any reason, the SFATP mechanism deletes the old value of rollingAverageFAT<B> and immediately starts to compile a new value for the just-operationalized home channel. The time constant for the FAT averaging process for band B is modelled with configurable parameter rollingAverageFATTimeConstant<B> which has units of seconds and must be whole integer multiple of 10 that is equal to or greater than 60 (e.g. 60, 90, 120, 240, and so on). Each 10-second period inferred instantaneous FAT equals to 1 minus the measured value of instantaneous usage minus measured value of instantaneous gross interference.

FIG. 3 is a flowchart illustrating steps for a qualitative state machine for maintenance of rollingAverageFAT<B>, under some embodiments. As shown in FIG. 3, process 300 starts in step 332 with creating an array of depth rollingAverageFATTimeConstant/10 with all cells=−1. It is assumed that the first cell in the array is cell 0. In step 334, the variable next_cell is set to 0, and the rollingAverageFAT variable is set to −1.

In step 336, it is determined whether or not a new instantaneous FAT value becomes available. If so, the process adds a fresh value to the next cell (cell 'next_cell'), step 338. It then conditionally increments the next cell variable, step 340, and updates the rollingAverageFAT to equal the average of all cells in the array that have a value other than −1, step 342. This updated rolling average FAT value from step 342 is then used in step 302 of FIG. 2.

Figure 4:
FIG. 4 is a diagram illustrating a sample rolling free airtime plot with defined threshold levels for access actions, under some embodiments.
Figure 4:
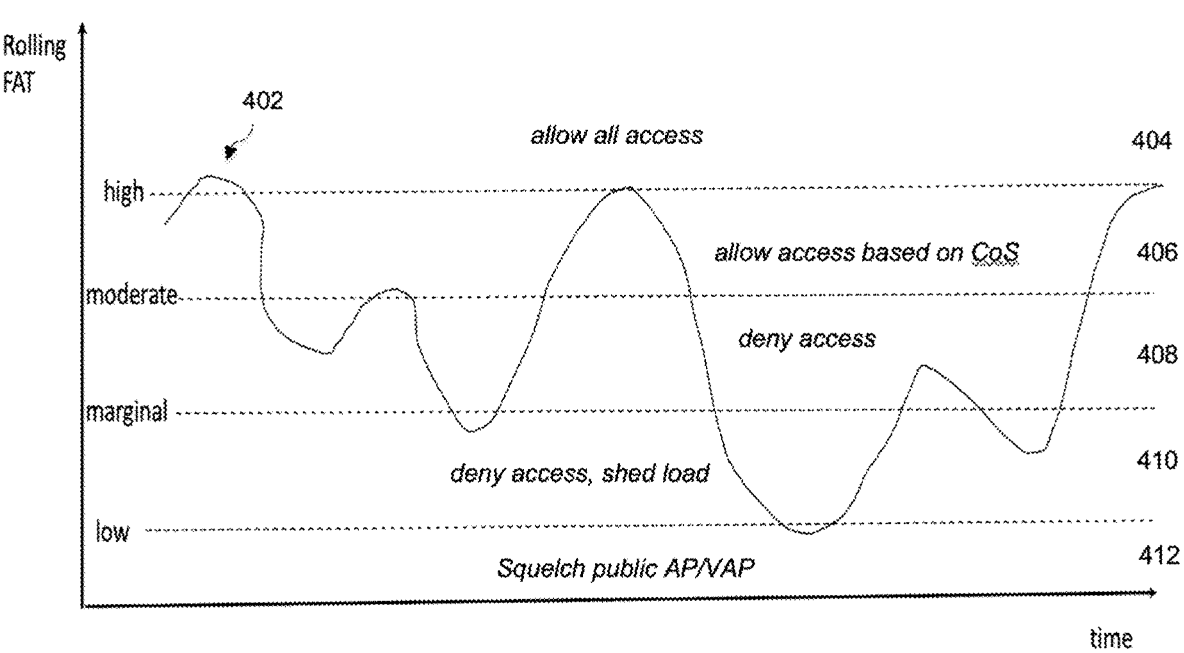

FIG. 4 is a diagram 400 illustrating a sample rolling FAT plot with defined threshold levels for access actions, under some embodiments. Diagram 400 of FIG. 4 shows a plot 402 of rolling FAT versus time for a single band. The normal threshold (shown as dashed lines) includes defined threshold values for High, Moderate, Marginal, and Low rolling FAT levels, and corresponds to the thresholds described in FIG. 2. As the rolling FAT value exceeds or goes between these threshold values, various actions are initiated.

As shown in FIG. 4, when the rolling FAT plot is in region 404 above the high threshold, no action against public device users is taken and all access may be allowed. If the rolling FAT value falls in the region 406 between the moderate and high thresholds results at least some public device users may be allowed access based on class of service. The region 408 between the marginal and moderate thresholds results in allowing access by at least some public device users based on class of service. The region 410 between the low and marginal thresholds results in denying access requests from all public device users and shedding of load until the rolling FAT exceeds at least the moderate threshold. If the rolling FAT falls in region 412 below the low threshold, the public access portion of the gateway is squelched, to forcibly disconnect any currently accessing public devices until the rolling FAT goes back above the high threshold.

As shown in FIG. 4, various actions can be taken depending on the rolling FAT value relative to the defined thresholds high/moderate/marginal/low. In an embodiment, the SFATP mechanism maintains a local variable to take action on or against public Wi-Fi clients on a particular band ('band B'). The variable is called SFATPAction<B>, where B can be up to 24, or any other appropriate number of bands, depending on system capacity and configuration. At any given time, the variable SFATPAction<B> has one of five steady-state values, which are:

lowFatActions
belowLowFatActions
highFatActions
moderateFATActions
marginalFAT actions.

Whenever band-B radio operationalizes a channel for any reason, the SFATP mechanism starts an initialization process. While that process is running SFATPActions<B> is clamped to preInitialzationActions. The initialization process will set SFATPActions<B> to one of the five steady-state values, once enough time has passed such that the rolling-average FAT of the just-operationalized channel is considered legitimate.

Figure 5:
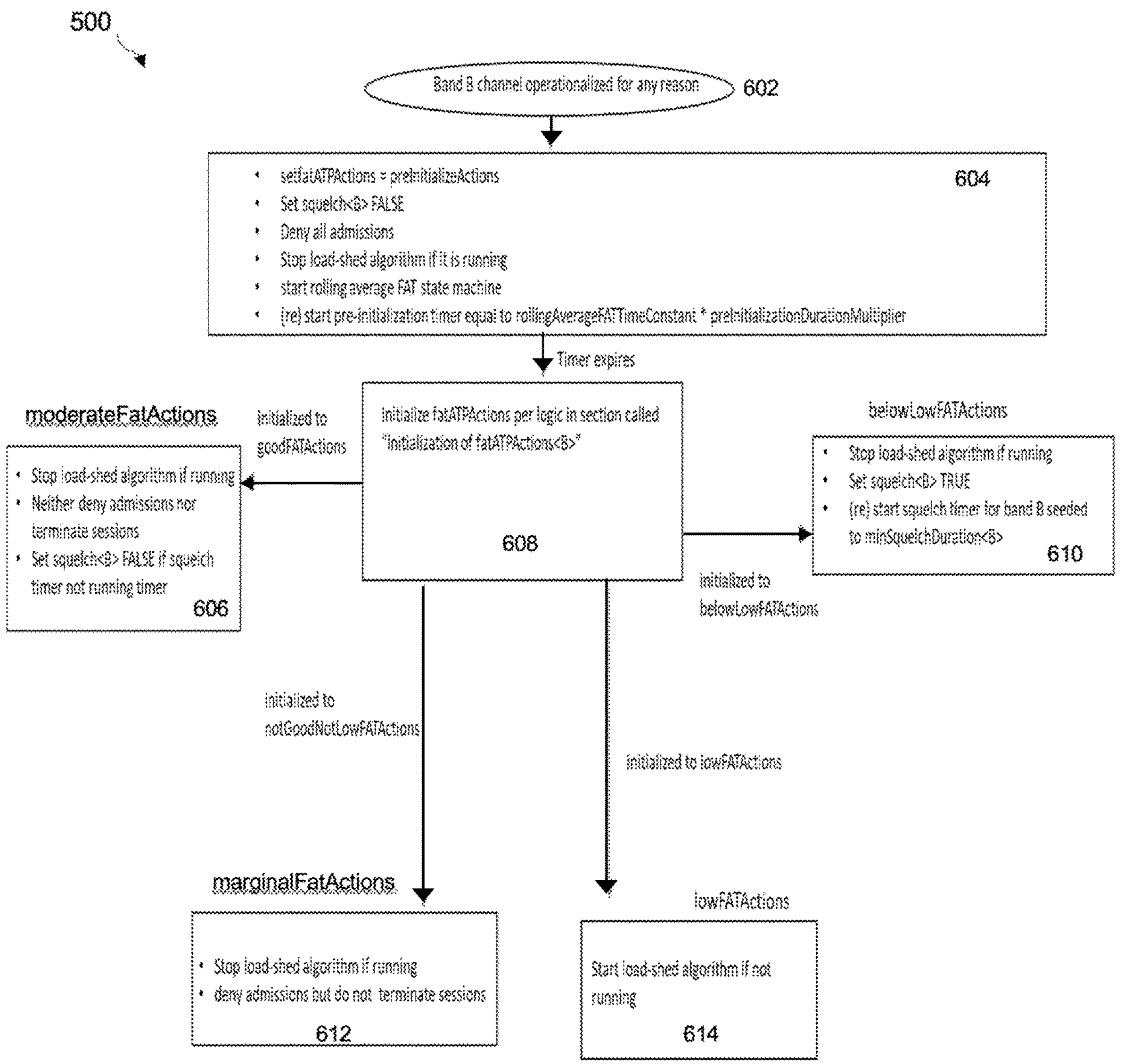
FIG. 5 illustrates a qualitative state machine diagram for an action initialization process, under some embodiments.

With respect to the initialization process, when a band-B radio operationalizes a home channel for any reason the SFATP mechanism must perform certain actions. FIG. 5 illustrates a qualitative state machine diagram 500 for the action initialization process, under some embodiments. Process 500 begins with a set of pre-initialization actions 604 that are performed when a band (Band B) is operationalized for any reason, 602.

These include first setting SFATPAction<B> equal to preInitializationActions; and second starting a pre-initialization timer for band B seeded to the product of two configurable parameters roilingAverageFATTimeConstant<B), and preInitializeDurationMultiplier<B> which is integer between 1 and 10 inclusive. The SFATP mechanism must clamp SFATPAction<B> equal to preInitializationActions while the pre-initialization timer is running. When the pre-initialization timer expires the SFATP mechanism will initialize steady-state value for SFATPActions<B>. The purpose for the pre-initialization timer is to provide enough time for a legitimate value of rollingAverageFAT to be compiled with respect to the just-operationalized before the mechanism enters steady state. The initial steady value ascribed to SFATPActions<B> is a function of rollingAverageFATCB> and the functional FAT threshold values which are drawn either from the normal or generous threshold set. The four functional threshold variables are listed below fatHighFunctional<B>
fatModerateFunctional<B>
fatMarginalFunctional<B> fatLowFunctional<B>

The initialization logic is as follows:

If rolling averageFAT<B> is greater than fatHighFunctional <B> then set SFATPActions<B> equal highFatActions; else If rollingAverageFAT<B> is greater than fatModerateFunctional<B> then set SFATPActions<B> equal moderateFatActions; else If rollingAverageFAT<B> is greater than fatMarginalFunctional <B> the set SFATPActions<B> equal marginalFatActions; else If rollingAverageFAT<B> is greater than fatLowFunctional B> then set SFATPActions<B> equal lowlFatActions; else set SFATPActions<B> equal belowLowActions The SFATP mechanism maintains the value of SFATPAction<B> while it has one of the steady-state values for steady state conditions that apply while SFATPAction<B> has a value other than preInitializationActions. In steady state the value of SFATPAction<B> is updated just after local variable rollingAverageFAT<B> is updated according to the same logic described above.

The following describes system behavior when SFATPActions<B> equals preInitializationActions, 604. While SFATPAction<B>=preInitializationActions, the SFATP mechanism will deny admission to all public Wi-Fi clients on band B. When SFATPAction<B> is set to preInitializationActions, the SFATP mechanism must stop any running timers maintained by the mechanism, stop the load shed algorithm if it is running, and set squelch<B> FALSE.

After the preInitializeActions 604, the process executes the fatATPActions 608, which include moderateFATActions 606, belowLowFATActions 610, marginalFATActions 612, and lowFATActions 614. Details of these different actions is provided directly below.

The following describes system behavior when SFATPActions<B> equals lowFatActions, 614. When the SFATP mechanism determines value of SFATPAction<B> needs to be changed to or remain lowFATActions or is initialized to the value of lowFATActions, it starts a load shed algorithm with respect to band B if that algorithm is not running, otherwise it will let the algorithm continue to run. The SFATP mechanism will stop the load shed algorithm when SFATPActions<B> is no longer equal to lowFATActions. Details of the load shed algorithm are provided below. While the load shed algorithm is running, the SFATP mechanism ensures no clients can be admitted to band B, and will periodically terminate one or more extant sessions from band B. When terminating sessions it targets them according, to the CoS in the sense that no higher CoS session will be terminated before any lower priority CoS session. When targeting a particular CoS it will terminate sessions according to either (a) session duration (where longer-duration sessions are terminated before shorter-duration sessions), or (b) time-average airtime usage (where sessions with higher time-averaged airtime usage are terminated for sessions with lower time-averaged airtime usage).

If the load shed algorithm is started when there are N>0 extant sessions on band B, then load shed algorithm will inexorably terminate all sessions unless it is prematurely stopped. Note that it is possible there might be N=0 extant sessions when the load shed mechanism starts. In any event, if and when the load shed algorithm determines there have been no sessions on band B for a configurable amount of time (encoded in parameter waitForFATToRecover<B>), the SFATP mechanism will set local variable squelch<B> to TRUE, and start (or re-start) a 'squelch' timer for band B seeded to value of configurable parameter called minSquelchDuration<3>. While squelch<B> is TRUE, the SFATP mechanism will ensure that the gateway on band B is dynamically disabled using beacon squelch or similar technique.

With respect to squelching, once squelch<B> is set TRUE, the SFATP mechanism will set it FALSE only when one of the following two conditions is satisfied: (1) the initialization process is started (i.e., SFATPActions<B> becomes equal to preinitializationActions), or (2) SFATPActions<B> is equal to highFatActions and the squelch timer for band B is not running. This means that if band-B gateway is squelched at time T, it will, assuming the band B radio does not operationalize a channel in the interim, stay squelched at least until T+minSquelchDuration<B> and could stay disabled for much longer. For example, assume that (a) minSquelchDurationCB> equals 900 seconds (15 minutes), (b) SFATPActions<B> changed from value other than belowLowFatActions to belowLowFatActions at end of 10-second multi-AP cadence that corresponds with time T, and (c) SFATPActions<B> remains equal to belowLowFatActions for the next 360 10-second cycles (which represents one hour of time), this then means that the band B gateway will be squelched from time T until at least time T+1.25 hours. It should be noted that squelching may be also performed for reasons other than operation of the SFATP mechanism, such as usage of a backup WAN by the gateway. The system may be configured such that before squelching a gateway, a report could be sent indicating that termination is imminent.

The following describes system behavior when SFATPActions<B> equals belowLowFatActions, 610. When the SFATP mechanisn determines value of SEATPAction<B> needs to be changed to or remain belowLowFatActions or is initialized to the value of belowLowFatActions, the SFATP mechanism will then: stop the load shed algorithm if it is running, set local variable squelch<B> to TRUE, and start (or re-start) a 'squelch' timer for band B seeded to minSquelchDuration<B>. As described previously, while squelch<B> is TRUE, the SFATP mechanism will ensure that the gateway on band B is dynamically disabled using beacon squelch or similar technique.

The following describes system behavior when SFATPActions<B> equals highFatActions. When the SFATP mechanism determines that the value of SFATPAction<B> needs to be changed to or remain highFatActions or is initialized to the value of highFatActions, it must stop the load shed algorithm if it is running. If the squelch timer for band B is stopped or stops while SFATPAction<B>=highFatActions, then the SFATP mechanism must set squelch<B> FALSE. Note that SFATPAction<B> can equal highFatActions while the gateway is being squelched because the squelch timer can be running while SFATPAction<B>=highFatActions. While SFATPAction<B>=highFatActions, the SFATP mechanism neither retroactively denies admission to clients on band B nor terminates on-going sessions on band B.

The following describes system behavior when SFATPActions<B> equals moderateFatActions. When the SFATP mechanism determines value of SFATPAction<B> needs to be changed to or remain moderateFatActions or is initialized to the value of moderateFatActions, it must stop the load shed algorithm if it is running. While SFATPAction<B>=moderateFatActions, the SFATP mechanism will unconditionally grant admission to higher priority CoS clients and throttle the rate at which it admits lower priority CoS clients in attempt to forestall further reductions of FAT. The throttling mechanism limits lower CoS client admissions on band B to allowed low priority Clients<B> clients every throttleMultiplier<B>*rollingAverageFATTimeConstant<B> seconds where: allowed15Clients<B> is configurable parameter integer>=0), and throttleMultiplier<B> is configurable parameter (integer>=1). If management sets allowed low-priority Clients<B> to 0, then no low priority CoS clients will be admitted. Similarly, if it is set to a high value and throttleMultiplier<B> is kept small, then all low priority CoS clients will be eligible for admission.

The following describes system behavior when SFATPActions<B> equals marginalFatActions. When the SFATP mechanism determines value of SFATPAction<B> needs to be changed to or remain marginalFatActions or is initialized to the value of highFatActions, it must stop the load shed algorithm if it is running. While SFATPAction<B>=marginalFatActions, the SFATP mechanism will retroactively deny admission to all public network clients on band B whose CoS value is equal to or greater than a basic tier value (e.g. CoS 15), but not deny admissions to clients with CoS value less than this value.

In an embodiment, the SFATP mechanism can support a ‘generous’ mode of operation that offers public Wi-Fi clients more airtime than normal-mode operation. For this mode, the SFATP mechanism needs two sets of thresholds per band: the normal set (e.g., high/moderate/marginal/low) and a generous set (e.g., high'/moderate'/marginal'/low'). Every generous threshold is less than or equal to its normal threshold counterpart, and at least one generous threshold is less than its normal threshold counterpart.

As shown in FIG. 4, The normal threshold set consists of the following four configurable parameters all of which are floats with value between 0 and 1 inclusive:

FATThresholdhigh<B>
FATThresholdModerate<B>
FATThresholdMarginal<B>
FATThresholdLow<B>.

The generous threshold set consists of the following four configurable parameters all of which are floats with value between 0 and 1 inclusive:

generousFatThresholdHigh<B>
generousFatThresholdModerate<B>
generousFatThresholdMarginal<B>
generousFatThresholdLow<B>.

It should be noted for both normal and generous threshold sets, each parameter must be greater than or equal to the parameter that precedes it, except generousFatThresholdLow<B>, which is not preceded by any other item. Additionally, each generous threshold needs to be less than the corresponding normal threshold value in order for the SFATP mechanism to support generous-mode operation. There may also be situations in which a lower generous threshold is above the next lower normal threshold. In this case, certain decision making logic may be utilized to determine the appropriate action.

For embodiments implementing generous mode, the SFATP mechanism works as described above, but with the certain modifications. For example, in steady state, the functional threshold set (the set that that the mechanism chooses to use) is qualitatively a function of the aggregate load offered by all non-public Wi-Fi clients on the radio. Specifically, if the non-public offered load is below a configurable threshold, then the generous threshold set will be used, otherwise the normal threshold set will be used. The non-public offered load is evaluated every 10 seconds (or similar) using a much smaller time constant than is used to enumerate the rolling average FAT value so that the mechanism can react swiftly to any changes in non-public offered load. In order to disable ‘generous’ mode, a management component can provision the residential gateway to ensure that the thresholds in both sets are pair-wise equal.

The system can be configured to operation between normal and generous mode through an appropriate variable, such as beGenerous<B>=TRUE or FALSE. The default mode upon initialization or for a defined time period may be referred to as ‘stingy’ mode in which the generous mode is claimed to FALSE to at least temporarily ensure conservative behavior. The value assigned to beGenerous<B> every ten seconds will be TRUE if both of the following conditions are met else it will be FALSE: (1) avgNonPPAirTimeUsage<B> is less than nonPPAirTimeUlsageThreshold<B>, and (2) avgNonPPDataConsumption<B> is less than nonPPDataConsumptionThreshold<B.

Figure 6:
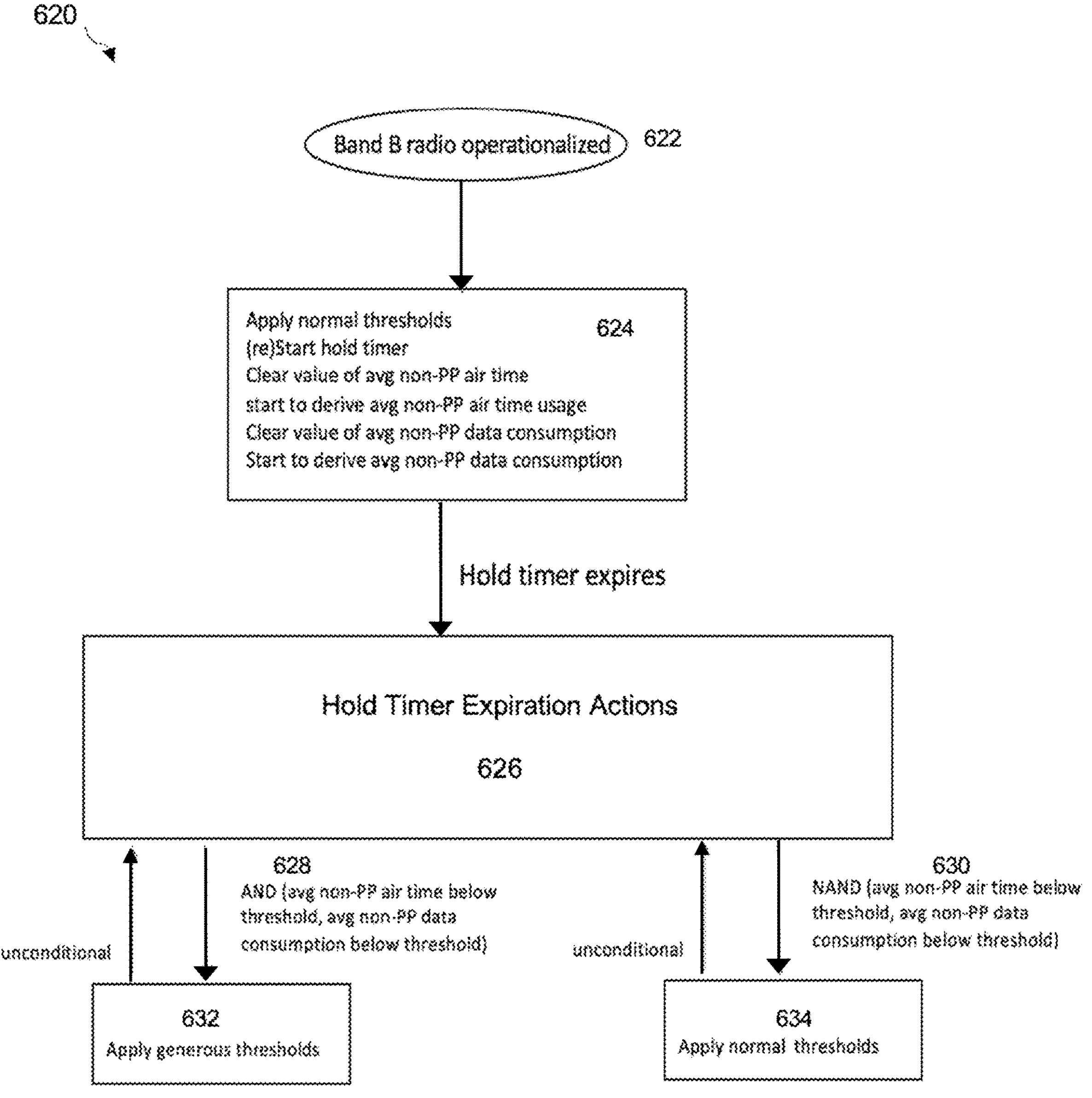
FIG. 6 illustrates a qualitative state machine diagram for applying generous or normal thresholds, under some embodiments.

In an embodiment, operation of the FAT control process between normal and generous modes can be determined dynamically based on certain airtime usage and data consumption characteristics. FIG. 6 illustrates a qualitative state machine diagram for applying generous or normal thresholds, under some embodiments. As shown in FIG. 6, process 620 starts with operation of the radio for a particular access point band (i.e., band B).

In state 624, the system first applies the normal thresholds levels (high/moderate/marginal/low), and starts or re-starts a hold timer. It then clears the average private (non-PP) airtime and starts to drive the average public (PP) airtime usage. It also clears the value of the average public data consumption and starts to derive the average public data consumption.

Upon expiration of the hold timer, an action 626 is performed. Such an action may be that the system applies the generous threshold 632 if the operation the average public airtime is below a first defined threshold AND the average public data consumption is below a second defined threshold), as shown in expression 628. The system applies the normal thresholds 634 if at least one of the average public airtime or data consumption is not below their respective threshold value, as shown in expression 630. Thus, the generous mode is used only if the public device uses less than a defined amount of both airtime and data consumption.

FIG. 6 is provided for purposes of illustration only, and other characteristics and operating parameters can be used to determine the use of generous versus normal thresholds.

In an embodiment, averaging is implemented with exponential weighted moving average (EWMA) using a large weight of 0.5 so that the mechanism reacts swiftly to instantaneous changes in private network client airtime usage. In each 10-second period P algorithm estimates airtime used by each private network client, i, in that period. The variable estimatedAirTime(i, P) represents this per the following equation:

$$\text{avgNonPPAirTimeUsage}\langle B\rangle=(1-\text{weight})*\text{current value of avgNonPPAirTimeUsage}\langle B\rangle+\text{weight}*\text{SUM for all } i \text{ of estimatedAirTime}(i,P)$$

When a previous value is unavailable (after channel operationalization):

avgNonPPAirTimeUsage<B> after channel operationalization=SUM for all i of estimatedAirTime (i, P).

For the above equations for avgNonPPAirTimeUsage<B>, each 10-second period P algorithm enumerates dataDSConsumption(i, P), which is DS consumption in units of bytes of used by each non-PP client i and dataUSConsumption(i, P), which is US data consumption in units of bytes for non-PP client i. New value avgNonPPDataConsumption<B>=(1−weight)*current value of avgNonPPDataConsumption<B>=+weight*(SUM across all i dataDSConsumption(i, P)+SUM across all i dataUSConsumption(i, P)). When a previous value is unavailable (after channel operationalization) initial value of avgNonPPDataConsumption<B>=after channel operationalization=SUM across all i dataDSConsumption(i, P)+SUM across all i dataUSConsumption(i, P).

The SFATP method described above is one way to calculate FAT for purposes of FAT control among public devices attempting to access private Wi-Fi networks. It should be noted, however, that embodiments are not so limited. Other methods of calculating FAT in a wireless network may also be used. In addition, mechanism that do not focus exclusively or entirely on free airtime may also be used. For example, a mechanism that utilizes re-transmission and error rates experienced by private network clients to determine whether to curtail or block public network clients can be used to maintain the private user experience. Similarly, embodiments may employ a mechanism that focuses less (or not at all) on FAT and instead focuses on happiness of private network clients.

In an embodiment, the SFATP mechanism is used by the FAT control component 208 to claim and retain FAT for privileged users in their private Wi-Fi network when their gateway is shared with public network users. In an embodiment, FAT is divided into four sections using three threshold levels, and a different behavior is assigned to each section with respect to accepting or rejecting access request, or forcing a disconnection of public devices. Although embodiments describe the use of three threshold levels (e.g., FIG. 4), it should be noted that fewer or greater thresholds and action regions can be used, depending on system configuration and requirements.

The control actions allow for all access requests on the public Wi-Fi network(s) to be allowed by the gateway, conditionally allowed, or rejected by the gateway. A force disassociation or disconnect action forces the disconnection of one or more of the devices associated to or currently accessing the public Wi-Fi network(s). In addition, a cool down time is defined and applied to each rejected and disconnected device in which no additional access requests are accepted by the public hotspot. The cool down times are randomized to avoid synchronized reconnection attempts. A blacklist may be maintained to prevent attempted re-access by a rejected or disconnected device, within at least a defined amount of time.

In an embodiment, the control actions utilize the available FAT as calculated per the refresh rate per band (e.g., 10 seconds) by the SFATP process described above. The availability of spare airtime in excess required by the private network devices is then provided for use by any public network devices until the FAT is fully consumed, at which point public devices are either rejected or forcibly disconnected.

In the case of forced disconnection, different policies can be defined to provide some fairness to disconnected public users. For example, policies can include disconnect the oldest connection first, disconnect the public user who transferred more data first, accommodate different classes of public user service (e.g., free and premium users) and so on.

The disconnection or access rejection actions may utilize one or more Wi-Fi parameters as input to any decision to restrict public access, such as a network device parameters to prioritize rejection of distant devices over closer devices or the physical layer data rate, or even device efficiency, where efficiency is the ratio of the current physical layer data rate over the maximum possible rate in the gateway in ideal Wi-Fi conditions.

Embodiments of the FAT control process and component provide several new features including using real time Wi-Fi measurements to inform the public device access control decisions, using the measure of FAT for access control of public devices to private Wi-Fi networks, and using adaptive control for public Wi-Fi access to private resources.

The FAT control process defines threshold levels differentiating several behaviors with respect allowing or blocking public Wi-Fi access to private Wi-Fi devices and networks. Embodiments prevent public usage from impacting the private user experience to protect and preserve airtime usage private users who pay for broadband/Internet access by constantly measuring FAT and only granting access to their Wi-Fi resources as a public hotspot if sufficient free airtime is available. Public usage is maximized over present systems that impose a fixed limit, because real-time determination of FAT allows spare capacity to be used by more public users.

As described above, in an embodiment, system 100 includes a FAT control processing component that may be implemented as a computer implemented software process, or as a hardware component, or both in a computing device such as gateway 202 in FIG. 1. As such, it may be an executable module executed by the one or more computers in the network, or it may be embodied as a hardware component or circuit provided in the system. The network environment of FIG. 1 may comprise any number of components coupled over the Internet or similar large-scale network or portion thereof. Each node in the network(s) comprises a computing device capable of executing software code to perform the processing steps described herein.

Such a device may include a processor, memory, interfaces, high-speed expansion ports, and interconnected busses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, subcombinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of providing access to public network devices to a private network accessing an Internet Protocol (IP) for use by private devices and the public devices, comprising:

providing a residential gateway device having an access point operable in one or more wireless frequency bands for Wi-Fi access to the Internet;

calculating an amount of free airtime available for the private devices through the access point; and defining regions along a time-based scale of free airtime availability from zero to 100%, each region allowing or denying access by one or more public devices depending upon an amount of free airtime used by all devices using the access point at a particular point in time;

defining plurality of threshold levels differentiating the defined regions to provide a portion of the free airtime to the public devices under defined conditions;

defining a high threshold level differentiating a first region of allowing access to the access point by the public devices from a second region of conditionally rejecting access by the public devices;

defining a moderate threshold level differentiating the second region from a third region of absolutely denying access by the public devices;

defining a marginal threshold level differentiating the third region from a fourth region of shedding load of public devices from the private network; and defining a low threshold level differentiating the fourth region from a fifth region of forcing disconnection of the public network devices from the access point, and wherein the free airtime is calculated through a stateless free airtime preservation (SFATP) process that operates independently for each Wi-Fi band supported by the access point.

2. The method of claim 1 wherein the amount of free airtime at the particular point in time comprises an instantaneous free airtime value derived from a rolling free airtime plot over the time-based scale.

3. The method of claim 2 wherein the amount of free airtime is determined through a calculating step performed periodically at a refresh rate on the order of 10 seconds.

4. The method of claim 1 wherein the SFATP calculates a rolling-average free airtime for comparison against the high, moderate, marginal and low threshold values to determine an action comprising at least one of: allowing access by the public devices, rejecting access by the public devices, and forcibly disconnecting currently accessing public devices.

5. The method of claim 4 wherein the private devices are operated by privileged users who are authorized to use the access point through at least one of ownership or contract, and wherein the public devices are operated by non-privileged users that utilize the access point as a public hotspot, and wherein the gateway is installed in a private premises comprising one of a house or small business building.

6. The method of claim 5 wherein the denying access and forcing disconnection both comprise applying policies dictating restriction of public usage of the private network based on at least one of: public device usage patterns, and assigned or defined priority.

7. The method of claim 6 wherein the policies further account for denying or reducing public device users based on respective class of service (CoS) commitments.

8. The method of claim 4 wherein the method further comprises squelching the gateway if the SFATP calculated free airtime is below the low threshold for a defined time period, and re-enabling the gateway after the free airtime exceeds the high threshold value.

9. The method of claim 1 further comprising: providing a generous mode defining a second set of four generous threshold levels providing greater utilization of the access point by public network devices, wherein each generous threshold level is less than or equal to a normal threshold counterpart, and at least one generous threshold level is less than its normal threshold level counterpart.

10. The method of claim 9 further comprising:

measuring an average public device airtime usage and an average public device data consumption for a time period of a hold timer;

determining use of either the generous threshold levels or the normal threshold levels based on the measured amount of average public device airtime usage and average public device data consumption relative to respective defined threshold values; and using the generous threshold levels only if the average public device airtime usage and average public device data consumption are both above their respective defined threshold values.

11. A method of allowing access by public network devices to a private network accessing the Internet and supporting private network devices, comprising:

calculating an amount of free airtime for a gateway access point in the private network through a stateless free airtime preservation (SFATP) process that operates independently for each Wi-Fi band hosting the gateway;

calculating a rolling-average free airtime to obtain the free airtime; and comparing the free airtime against four defined normal threshold levels to determine an action comprising at least one of: allowing access by public network devices, rejecting access by the public network devices, and forcibly disconnecting currently accessing public network devices.

12. The method of claim 11 wherein the normal threshold levels define action regions each correlating to a respective action, and wherein a first region value takes no action regarding access by the public network devices, a second region allows the conditional access by the public network devices to the private network, a third region denies the access, a fourth region denies the access and further sheds load from the private network, and a fifth region forcibly disconnecting currently accessing public network devices.

13. The method of claim 12 further comprising: providing a generous mode defining a second set of four generous threshold levels providing greater utilization of the private network by public network devices, wherein each generous threshold level is less than or equal to a corresponding normal threshold, and at least one generous threshold level is less than its corresponding normal threshold level.

14. The method of claim 13 further comprising:

measuring an average public device airtime usage and an average public device data consumption for a time period of a hold timer;

determining use of either the generous threshold levels or the normal threshold levels based on the measured amount of average public device airtime usage and average public device data consumption relative to respective defined threshold values; and using the generous threshold levels only if the average public device airtime usage and average public device data consumption are both above their respective defined threshold values.

15. A system for allowing access by public network devices to a private network accessing the Internet and supporting private network devices, comprising:

a stateless free airtime preservation (SFATP) component calculating an amount of free airtime for a gateway access point in the private network, and that operates independently for each Wi-Fi band hosting the gateway;

a component calculating a rolling-average free airtime to obtain the free airtime; and a comparator comparing the free airtime against four threshold values to determine an action comprising at least one of: allowing access by public network devices, rejecting access by the public network devices, and forcibly disconnecting currently accessing public network devices.

16. The system of claim 15 wherein the threshold values each correlate to a respective action, and wherein a first threshold value takes no action, a second threshold value allows the access, a third threshold value rejects the access, and a fourth threshold value disconnects any currently accessing public network devices, and wherein the threshold values are denoted high, moderate, marginal, and low.

17. The system of claim 16 wherein the actions comprise:

limiting a number of public network device access requests if the SFATP calculated free airtime is above the moderate threshold value;

denying all public network device access requests if the SFATP calculated free airtime is above the marginal threshold value;

denying all public network device access requests and shedding load to increase the free airtime if the SFATP calculated free airtime is above the low threshold value; and squelching the gateway if the SFATP calculated free airtime is below the low threshold for a defined time period, and re-enabling the gateway after the free airtime exceeds the high threshold value.

* * * * *